United States Patent [19]

Larmie

[11] Patent Number: 5,429,647
[45] Date of Patent: Jul. 4, 1995

[54] METHOD FOR MAKING ABRASIVE GRAIN CONTAINING ALUMINA AND CERIA

[75] Inventor: Henry A. Larmie, Oakdale, Minn.

[73] Assignee: Minnesota Mining and Manufacturing Company, St. Paul, Minn.

[21] Appl. No.: 181,474

[22] Filed: Jan. 13, 1994

Related U.S. Application Data

[63] Continuation of Ser. No. 951,443, Sep. 25, 1992, abandoned.

[51] Int. Cl.⁶ ............................................. C09C 1/68
[52] U.S. Cl. .................................... 51/295; 51/309
[58] Field of Search ........................ 51/293, 295, 309

[56] References Cited

U.S. PATENT DOCUMENTS

| | | | |
|---|---|---|---|
| 3,454,385 | 7/1969 | Amero | 51/298 |
| 3,891,408 | 6/1975 | Rowse et al. | 51/295 |
| 4,126,429 | 11/1978 | Watson | 51/309 |
| 4,314,827 | 2/1982 | Leitheiser et al. | 51/298 |
| 4,331,627 | 5/1982 | Yamamoto et al. | 51/309 |
| 4,333,859 | 6/1982 | Vaughan et al. | 423/712 |
| 4,457,767 | 7/1984 | Poon et al. | 51/298 |
| 4,518,397 | 5/1985 | Leitheiser et al. | 51/293 |
| 4,744,802 | 5/1988 | Schwabel | 51/309 |
| 4,770,671 | 9/1988 | Monroe et al. | 51/293 |
| 4,829,031 | 5/1989 | Roy et al. | 501/134 |
| 4,881,951 | 11/1989 | Wood et al. | 51/309 |
| 4,960,441 | 10/1990 | Pellow et al. | 51/293 |
| 4,997,461 | 3/1991 | Markhoff-Matheny et al. | 51/295 |
| 5,002,911 | 3/1991 | Matsumoto et al. | 501/105 |
| 5,009,675 | 4/1991 | Kunz et al. | 51/295 |
| 5,131,926 | 7/1992 | Rostoker et al. | 51/309 |
| 5,185,299 | 2/1993 | Wood et al. | 501/95 |
| 5,194,072 | 3/1993 | Rue et al. | 51/309 |
| 5,201,916 | 4/1993 | Berg et al. | 51/293 |
| 5,204,300 | 4/1993 | Kumagai et al. | 501/127 |
| 5,215,551 | 6/1993 | Hatanaka et al. | 51/293 |
| 5,259,147 | 11/1993 | Falz et al. | 51/293 |

FOREIGN PATENT DOCUMENTS

| | | | |
|---|---|---|---|
| 394850 | 12/1991 | Austria | C04B 35/10 |
| 0236507A1 | 9/1987 | European Pat. Off. | C04B 35/10 |
| 256182A1 | 2/1988 | European Pat. Off. | C04B 35/10 |
| 0293163 | 11/1988 | European Pat. Off. | C04B 35/10 |
| 0293164A2 | 11/1988 | European Pat. Off. | C04B 35/10 |
| 0368837 | 5/1990 | European Pat. Off. | C04B 35/10 |
| 408771A1 | 1/1991 | European Pat. Off. | C04B 35/10 |
| 0435677A2 | 7/1991 | European Pat. Off. | C04B 35/10 |
| 0441640A2 | 8/1991 | European Pat. Off. | C04B 35/10 |
| 4097942 | 3/1992 | Japan | C04B 35/18 |
| WO92/01646 | 2/1992 | WIPO | C04B 35/10 |

OTHER PUBLICATIONS

Raymond A. Cutler et al., "High–Toughness Ce–TZ-P/Al₂O₃ Ceramics with Improved Hardness and Strength," *J. Am. Ceram Soc.*, 74, (1), 1991, pp. 179–186.

E. Breval et al., "The Hardness, Stiffness and Toughness of Diphasic Abrasive Materials Prepared by Sol–Gel Techniques," *Mat. Res. Bull.*, 20, No. 4, 1985, pp. 413–429.

S. Charles Yoon et al., "Use of Sintered Ceramic Aluminum Oxides in Vitrified Bonded Wheels," *Society of Manufacturing Engineers*, EM90–360, 1990.

Donald R. Ulrich, "Chemical Processing of Ceramics," *C&EN Special Report*, Jan. 1, 1990.

S. Hori et al., "Influence of Small ZrO₂ Additions on the Microstructure and Mechanical Properties of Al₂O₃," *Advances in Ceramics, Science and Technology of Zirconia III*, 24A, The American Ceramic Society, 3rd, 1986; Tokyo, Japan; pp. 423–429.

*Primary Examiner*—Deborah Jones
*Attorney, Agent, or Firm*—Gary L. Griswold; Walter N. Kirn; Gregory D. Allen

[57] ABSTRACT

A method of preparing abrasive grain includes: preparing a dispersion including alpha alumina oxide monohydrate and ceria sol therein; converting the dispersion to base grit material; and sintering the base grit to form abrasive grains. The grain are useful in abrasive products.

21 Claims, 2 Drawing Sheets

METHOD FOR MAKING ABRASIVE GRAIN CONTAINING ALUMINA AND CERIA

This is a continuation of application Ser. No. 07/951,443 filed Sep. 25, 1991, now abandoned.

FIELD OF THE INVENTION

The present invention relates to a method of making alumina-ceria abrasive grain. The alumina-ceria abrasive grain are useful in abrasive products.

BACKGROUND OF THE INVENTION

The abrasives industry generally concerns abrasive products comprising a binder and a plurality of abrasive grains, which are used to abrade a workpiece (e.g., stainless steel). It is the abrasive grains which are responsible for the cutting action of an abrasive product, when it is applied to the workpiece. During use, the abrasive grains of an abrasive product can be subject to relatively high pressures, temperatures and rotative speeds; thus, preferred abrasive grains are tough and chemically resistant to the workpiece being abraded. In general, the hardness property is associated with the abrasive grain resisting yield from the forces of grinding. The toughness property is associated with the strength and fracture resistance of the abrasive grain. Chemical resistance generally relates to the chemical nature of the material from which the abrasive grain is formed and the conditions of grinding.

Abrasive grains comprising fused aluminum oxide are well known and widely utilized. Over the past decade, improved abrasive grains generally comprising the product of a sol-gel ceramic process conducted with aluminum oxide have also been developed. Such improved ceramic grains are generally tougher than fused aluminum oxide grains.

SUMMARY OF THE INVENTION

According to the present invention, a method of preparing abrasive grain is provided. The method generally includes the steps of preparing a dispersion comprising alumina hydrate and an effective amount of ceria (as a sol) therein. From the dispersion is formed alumina base grit material including ceria therein. The ceria is distributed relatively evenly throughout the base grit material. The base grit material, which is preferably calcined, is sintered to provide an abrasive grain comprising alumina and ceria. Depending on the processing conditions, and the weight percentages of the oxide components, some or all of the ceria may react with alumina to form a reaction product(s) (e.g., CeAlO$_3$ and CeAl$_{11}$O$_{18}$). Alumina present as Al$_2$O$_3$ (i.e., alumina which does form a reaction product with ceria and/or other metal oxide(s)) is present as alpha alumina. The term "reaction product(s)" as used herein refers to oxide(s) that form between two or more metal oxides. For example, alumina and ceria may react to form a reaction product as described above; alumina and magnesium oxide, if present, may react to form spinel; and titanium oxide, if present and magnesium oxide, if present, may react to form MgTi$_2$O$_4$. CeAlO$_3$ and CeAl$_{11}$O$_{18}$ are examples of both alumina reaction products and ceria reaction products. Further, spinel is an example of reaction product that is both an alumina reaction product and a magnesium oxide reaction product.

In general, the dispersion from which the base grit material is formed should include a weight ratio therein of ceria to alumina hydrate within the range of about 0.5 to about 25. Typically, the ceria to alumina hydrate weight ratio is from about 0.5 to about 15. If the ceria is added to the dispersion as a ceria sol, the ceria sol added should generally comprise about 5 to about 40%, preferably about 10 to about 20%, colloidal ceria particles, the remainder generally comprising the liquid carrier for the ceria sol. Alternatively, the ceria particles can be mixed into the dispersion with ceria sol formation generated in situ. In preferred practices according to the present invention, the ceria particles in the dispersion from which the base grit material is formed comprise at least about 97% by weight ceria particles less than about 0.5 micrometer (preferably at least about 50% by weight less than about 0.1 micrometer) in size. Preferably, the ceria particles are at least about 40% by weight less than about 0.05 micrometer in size.

The method may include preparing a dispersion having nucleating material therein. The term "nucleating material" as used herein refers to a nucleating agent or precursor thereof. The method may also involve a step of including a metal oxide precursor (modifier precursor) within the dispersion.

The base grits formed from the dispersion may be treated, for example, by impregnating with metal oxide (modifier precursor) precursor solution and/or by coating prior to sintering.

In one preferred method according to the present invention, the dispersion includes an effective amount of the particles, and is essentially free of cerium salt (e.g., cerium nitrate). Preferably, abrasive grain made according to this method comprises by weight: (a) about 70 to about 99.9% alumina, said alumina being present as one of alpha alumina, an alumina reaction product(s), or a combination thereof; (b) about 0.1 to about 15% ceria (typically about 1 to about 15%), said ceria being present as one of ceria, a ceria reaction product(s), or a combination thereof; and (c) up to about 15% of metal oxide selected from the group consisting of magnesium oxide, zirconia, lanthanum oxide, neodymium oxide, yttria, and combinations thereof, said metal oxide being present as one of a metal oxide, a metal oxide reaction product(s), or a combination thereof.

In another preferred method according to the present invention, the dispersion includes a sufficient amount of the ceria particles to provide the sintered abrasive grain with greater than 0.5% by weight ceria (present as one of ceria, a ceria reaction product(s), or a combination thereof). Preferably, abrasive grain made according to this method comprises by weight: (a) about 70 to less than 99.5% (typically about 70 to less to about 99% alumina, said alumina being present as one of alpha alumina, an alumina reaction product(s), or a combination thereof; (b) about 0.1 to about 15% ceria (typically about 1 to about 15%), said ceria being present as one of ceria, a ceria reaction product(s), or a combination thereof; and (c) up to about 15% of metal oxide selected from the group consisting of magnesium oxide, zirconia, lanthanum oxide, neodymium oxide, yttria, and combinations thereof, said metal oxide being present as one of a metal oxide, a metal oxide reaction product(s), or a combination thereof.

In another aspect, preferred abrasive grain according to the method of the present invention comprises alumina, ceria, zirconia, magnesium oxide, and at least one metal oxide selected from the group consisting of lanthanum oxide, neodymium oxide, and yttria, wherein said alumina is present as one of alpha alumina, alumina reaction product, or a combination thereof, said ceria is present as one of ceria, ceria reaction product, or a combination thereof, said magnesium oxide is present as a magnesium oxide reaction product(s), and said metal oxide is present as one of a metal oxide, a metal oxide reaction product(s), or a combination thereof.

Abrasive grain made according to the method of the present invention are useful in abrasive products.

The drawings comprise a part of this specification and include therein exemplary embodiments. In the drawings, relative material thicknesses may be shown exaggerated to facilitate an understanding of the invention.

DETAILED DESCRIPTION OF THE PREFERRED EMBODIMENTS

Figure 1:
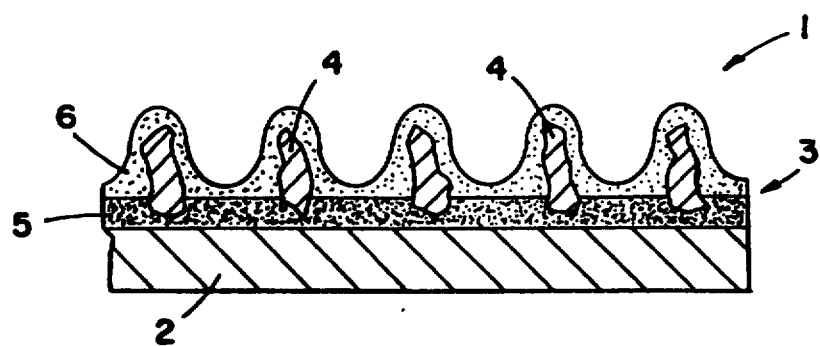
FIG. 1 is a fragmentary cross-sectional schematic view of a coated abrasive product incorporating abrasive grain according to the present invention therein.

The present invention concerns the discovery that unique abrasive grains result if the abrasive grains are formed from a ceramic sol-gel process in which the sol-gel is formed from aluminum hydrate and an effective amount of ceria as a sol. The invention also concerns abrasive products incorporating abrasive grain according to the general principles described herein. Resulting advantage will generally be reflected in product performance and/or product lifetime.

Herein the term "abrasive grain" and variants thereof will be used to refer to the granular abrasive material after it has been prepared for inclusion in an abrasive product. The term "base grit" or "base grit material" will be used to refer to alumina-based, ceria-containing ceramic grit precursor which when sintered, or calcined and sintered, provide abrasive grain according to the present invention. Calcined or uncalcined base grit as described herein, typically have sufficient porosity to allow a liquid (e.g., water or organic solvent) to impregnate the pores through capillary action.

Preparation of the Base Grits

In general, base grits according to the present invention are prepared according to a process involving the steps of: (a) generating a dispersion of alumina hydrate and ceria as a sol; and (b) drying the dispersion. The dried dispersion may be crushed to produce particles as base grits. Alternatively, the dispersion may be only partly dried, shaped, and then further dried to base grit material. The base grit material may be converted to abrasive grain by sintering. Optionally, the base grits may be classified and/or modified prior to the sintering process.

Sol-gel processes for preparation for alpha alumina base grits are generally described, for example, in U.S. Pat. Nos. 5,011,508 (Wald), 4,744,802 (Schwabel), 4,623,364 (Cottringer), 4,574,003 (Gerk), 4,518,397 (Leitheiser et al.), 4,770,671 (Monroe), and 4,881,951 (Wood), the disclosures of which are incorporated herein by reference. In general, the sol gel processes disclosed in those references are followed in preferred applications of the present invention, except for the inclusion within the sol gel of ceria as a ceria sol, as described hereinbelow. The presence of an effective amount of ceria, as a sol, within the sol gel is associated with advantageous abrasive grains according to the present invention.

Preparation of the alumina base grits by the sol-gel process typically involves first preparing a dispersion comprising about 2 to about 60 weight percent alpha aluminum oxide monohydrate (typically boehmite), although other alumina oxide hydrates may be used; and an effective amount of ceria as a sol. The weight percent of alpha alumina monohydrate stated is based on a total of aluminum oxide hydrate plus liquid carrier, without regard to adjuvants or other additives. The boehmite can be prepared from various conventional techniques or it can be acquired commercially. Commercially available boehmite usable in sol-gel processes as described herein include: Disperal ®, available from Condea Chemie, GMBH of Hamburg, Germany, and Catapal ®, available from Vista Chemical Co. of Houston, Tex. These aluminum oxide monohydrates are in alpha form, are relatively pure (including relatively little, if any, hydrate phases other than the monohydrate), and have a high surface area.

Although the liquid carrier may be a non-polar organic carrier (e.g., heptane and hexane), the liquid carrier is typically water, preferably deionized water. Generally, the dispersion (with respect to all components) contains at least about 10% by weight, liquid carrier, preferably between about 30 and about 80% by weight, liquid carrier.

As indicated above, the dispersion should contain an effective amount ceria as a sol. The term "effective amount", in this context, refers to a requirement that the dispersion contain sufficient ceria particles as a sol such that the sintered abrasive grain derived therefrom has a density of at least about 90 percent of theoretical.

A ceria sol comprises a plurality of colloidal ceria particles (cerium oxide) dispersed in liquid medium. The liquid medium comprises water (preferably deionized water) or an organic medium (e.g., non-polar organic carrier, e.g., heptane and hexane), however, it is preferred that a majority (greater than 50% by weight) of the liquid medium be water (preferably deionized water). Ceria sol presence in the aluminum oxide dispersion may be assured by adding a pre-prepared ceria sol to the dispersion. Suitable ceria sols are commercially available, for example, from Nyacol Products, Inc. of Ashland, Mass. Alternatively, ceria particles (not as a sol) can be mixed into the dispersion.

The ceria particles should be classified to a size of at least about 97% by weight less than about 0.5 micrometers, preferably about 50% by weight less than about 0.1 micrometer. More preferably, the ceria particles comprise at least about 40% by weight less than about 0.05 micrometer. Herein, the term "size" in this context is meant to refer to the longest dimension of the particles (typically approximating a diameter since the particles are often equiaxed or nearly round). If the ceria is added as a sol, the ceria sol added to the aluminum oxide dispersion preferably contain, by weight, between about 5% and about 40%, more preferably, between about 10% and about 20% colloidal ceria particles. Preferably, at least about 97% by weight of the ceria particles are less than about 0.5 micrometer (preferably, at least about 50% by weight less than about 0.1 micrometer) in size. The pH of the ceria sol should generally be less than about 5, preferably less than about 4. The ceria sol may contain nitric acid or acetic acid as a stabilizer to inhibit agglomeration of the ceria particles.

The dispersion may be formed from the ceria (preferably as a sol), alpha aluminum hydrate, liquid carrier, and any adjuvants by simply mixing the components together. A convenient method is to add the ceria particles (as a sol) to the alpha alumina hydrate dispersion with high shear mixing.

A peptizing agent may be used in the dispersion, to produce a more stable hydrosol or colloidal dispersion. Monoprotic acids which may be used as the peptizing agent include acetic, hydrochloric, formic, and nitric acids. Nitric acid is the preferred peptizing agent. Multiprotic acids are generally avoided, because they tend to rapidly gel the dispersion, making it difficult to handle or to mix in additional components. Some commercial sources of boehmite contain an acid titer (e.g., acetic, formic, or nitric acid) to assist in forming a stable dispersion.

The dispersion may contain a precursor or modifying additive (modifier) which is added to enhance some desired property of the finished product or to increase the effectiveness of a subsequent processing step (e.g., sintering). Such modifiers are generally introduced in the form of a modifier precursor to an oxide (typically a metal salt material which is a precursor to the corresponding oxide; conversion being accomplished upon application of heat to calcine) soluble in a liquid carrier. They typically comprise water soluble salts. Mixtures of modifiers or modifier precursors may be utilized. Water soluble salts comprising metal salt precursors (e.g., nitrates or acetates) for oxides of: magnesium, zinc, cobalt, nickel, hafnium, chromium, yttrium, praseodymium, samarium, ytterbium, neodymium, lanthanum, gadolinium, zirconium, dysprosium, erbium, titanium, and mixtures thereof are usable modifier precursors. Even cerium salts may be used, if they are not used in place of the ceria particles (sol). The addition of modifier precursor salt(s) generally results in gelation of the dispersion. Exact proportions of these components present in the sol-gel dispersions (for grit formation) are not critical to the principles of the present invention and, thus, can be varied to convenience. Modifiers and their uses in abrasive grains are further described, for example, in U.S. Pat. Nos. 4,518,397 (Leitheiser et al.), 4,770,671 (Monroe), and 4,881,951 (Wood), the disclosures of which are incorporated herein by reference.

A preferred means for incorporating zirconia into the abrasive grain is disclosed in Assignee's copending application entitled "Abrasive Grain Containing Alumina and Zirconia Oxide Therein," U.S. Ser. No. 07/951,654, filed the same date as the instant application, the disclosure of which is incorporated herein by reference.

The dispersion may contain a nucleating material in an amount effective to enhance the transformation to alpha alumina. Suitable nucleating materials include fine particles of alpha alumina, alpha ferric oxide or its precursor, titanates or their precursors, chromium oxide or its precursor, and other materials which can nucleate the transformation of the base grits during sintering. Nucleating such dispersions as disclosed, for example, in U.S. Pat. Nos. 4,774,802 (Schwabel), 4,623,364 (Cottringer), and 4,964,883 (Morris), the disclosures of which are incorporated herein be reference.

Shaping of the gel, which is optional, may be accomplished by conventional means such as pressing, molding, coating, extrusion, cutting, or some combination of those steps, with drying. It may be done in steps, for example, by first forming a plastic mass of the partially dried dispersion through extrusion. The resulting plastic mass is shaped by any convenient method such as pressing, molding, or extrusion and is then dried to produce the desired shape, for example, a rod, pyramid, disk, diamond, cone, or similar shape. Irregularly-shaped abrasive grain products are conveniently formed by depositing the dispersion in any convenient size and shape of drying vessel (e.g., a pan-shaped vessel) and drying, typically at a temperature below the frothing temperature of the dispersion.

After the dispersion is formed, it is dried to a solid, often with a step of gelation. Conventional means may be utilized to dry the dispersion. Air drying steps may be used as well as various dewatering methods. Drying can be accomplished, for example, in a forced air oven at a temperature in the range of about 50° C. to about 200° C., preferably between about 75° C. and about 125° C. Generally, the gelled dispersion is heated slowly during drying to inhibit frothing.

The dried dispersion may be reduced in size by crushing through any suitable means, such as a hammer mill, ball mill, or roll crusher. Any method of comminuting the solid can be used and the term "crushing" is meant to refer to any such method. In general, a wide variety of particle sizes, i.e., about 10 to about 4000 micrometers, may be used as base grits. Generally a selected size range is isolated for any given use. Classification steps such as screening may be used to obtain selected particle sizes or size fractions. It is noted that sintering, or calcining and sintering, generally leads to particle shrinkage on the order of about 33% of linear dimension This should be taken into consideration during fraction selection.

The crushed or shaped material may, in some instances, comprise the base grits or base grit material. In other instances, the crushed or shaped material will comprise a "grit precursor," the base grit material being formed by calcining the material or providing other modifications thereto. In typical applications it will be preferred to calcine the base grit material to remove water. If the grits are formed using a non-polar organic solvent as the liquid carrier, a step of calcining will typically not be needed.

During calcining, essentially all of the volatiles are removed from the grit precursor. Further, any modifier precursors that were present in the dispersion and which are now retained within the grit precursor are transformed to metal oxide(s) during the calcining process. During calcining, the base grits are generally heated to a temperature between about 400° C. and about 1000° C., preferably 400° C. to 800° C. The resulting calcined base grits are porous particles.

Conversion of the Base Grit Material to Improved Abrasive Grains

The principal step of conversion of the base grit material to abrasive grains is sintering of the base grits to provide ceramic abrasive grain comprising alumina and ceria. However, modifiers, nucleating materials, and/or coating may be added to the base grits.

A. Sintering of the Abrasive Grain Precursor

Sintering of the grains may be accomplished through a variety of conventional processes. Typically, the sintering will be conducted at a temperature between about 1200° C. and 1650° C. for a sufficient period of time to complete the conversion of the precursor. Generally, the sintering step comprises the conversion of the alumina to alpha alumina (or alpha alumina and reaction product of alumina with metal oxide modifier(s)). Although the length of time to which the treated base grits should be exposed to sintering temperatures may be varied depending upon factors such as the precise composition of the treated grit, generally sintering can be accomplished within a time period of a few seconds to about 120 minutes. Sintering at various types of base grits is described, in general, in U.S. Pat. No. 4,314,827 (Leitheiser et al.), incorporated herein by reference. The techniques of sintering described in that reference may be applied to grits prepared according to the present invention.

B. (Optional) Impregnation of Porous Base Grits with Modifier And/Or Nucleating Material Prior to Sintering In some instances, preferred characteristics can be imparted to the sintered product by impregnating the base grits and/or grit precursors with an impregnating solution of a metal oxide modifier provided in the form of precursor comprising one or more salts of a metal (e.g., a metal nitrate or acetate salt). Impregnating is generally described in U.S. Ser. No. 07/799,867, filed Nov. 27, 1991, incorporated herein by reference. In general, impregnation involves mixing a liquid medium (preferably water, more preferably deionized water, although a non-polar solvent (e.g., heptane or hexane) may also be useful) having the metal salts dissolved therein with the base grits. Calcined base grits prepared according to the sol-gel process are porous; i.e., they generally have pores about 700–900 nanometers in size (diameter) extending from an outer surface. Preferably, at least about 60 ml of the impregnating solution is mixed with each 100 grams of porous base grit, if the grits are prepared as described above, to achieve a thorough saturation of the grits with the solution. The modifier precursors may be selected from the group identified above as optionally usable in the sol gel process. Generally, impregnation will be sufficient if the resulting base grit, after impregnation and later sintering, includes at least about 0.1% by weight, and, preferably, about 1 to about 30% by weight of the oxide product of the impregnate (the weight percentage being calculated on the basis of the total weight of the sintered abrasive grain and on a theoretical elemental oxide basis).

For impregnation of dried gel, the liquid medium should be selected such that the dried gel is not dissolved by it. For example, a dried gel derived from an aqueous gel, will dissolve in water. A suitable liquid medium for an impregnating solution for a dried gel derived from an aqueous gel may be a non-polar solvent.

A nucleating material may be added to the base grits. The nucleating material may added by treating the porous base grits or grit precursors with a liquid medium having the nucleating material carried therein. The treatment may be conducted simultaneously with impregnation of the modifier precursor(s).

The abrasive grains of the present invention may further comprise a surface coating, i.e., a coating covering the sintered core. Typically, the coating will comprise silica and/or metal oxide, most typically zirconia, or alumina (e.g., alpha alumina, transitional alumina, or hydrated alumina). Any of a variety of coating methods may be utilized, including the ones described in U.S. Pat. Nos. 5,011,508 (Wald), 1,910,440 (Nicholson), 3,041,156 (Rowse), 5,009,675 (Kunz), 4,997,461 (Markhoff-Matheny), and 5,042,991 (Kunz), the disclosures of which are incorporated herein by reference. The preparation of the coating may include the use of nucleating material. In some instances a preferred coating not described in the above-cited references, may be applied to the base grits by addition of a dispersion or suspension carrying inorganic particulates (typically metal oxides) therein to the base grits. A coating formed from inorganic particulates in this manner is described in Assignee's copending U.S. application Ser. No. 07/920,768, incorporated herein by reference. An alternative coating formed from metal alkoxides is described in Assignee's copending U.S. application Ser. No. 07/920,834, incorporated herein by reference.

C. The Resulting Abrasive Grain

The presence of the ceria in the alumina system, when the ceria is provided as a particle sol in the alpha alumina monohydrate sol-gel, as well as the particle size of the ceria and the volume present, enhances the properties of the resulting abrasive grains. It is presently believed that the ceria particles (when added according to the sol process as described) may improve the microstructure of the abrasive grains by hindering grain growth in the alpha alumina and alumina reaction products. Thus, it is theorized that the addition of ceria (as a sol) refines and homogenizes the alumina microstructure and aids in densification. In general, by comparison to abrasive grains made from the same formulation but including ceria added as an oxide precursor (cerium salt) rather than as a sol, abrasive grains according to the present invention are harder and denser.

Figure 5:
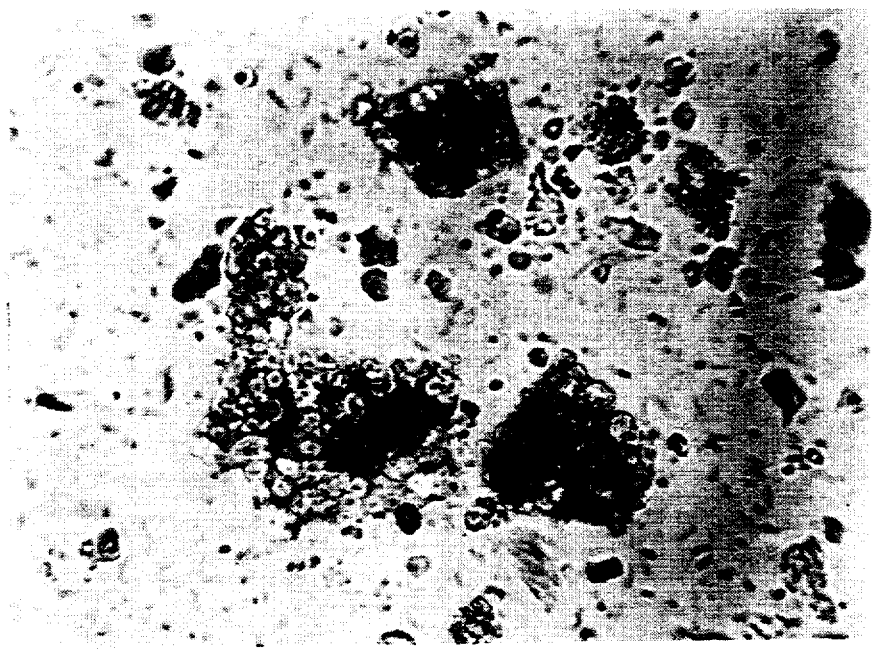
FIG. 5 is an optical photomicrograph (taken under cross-polarized light) at 400× of an abrasive grain derived from an alumina sol having a cerium salt added thereto.
Figure 4:
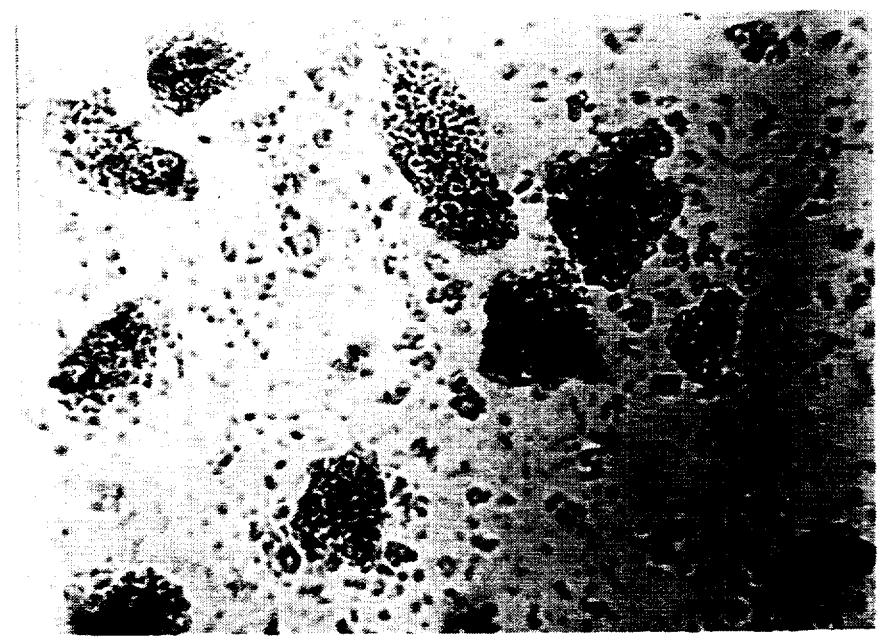
FIG. 4 is an optical photomicrograph (taken under cross-polarized light) at 400× of a sintered abrasive grain derived from an alumina sol having ceria sol added thereto.

The microstructure of abrasive grain according to the present invention will be understood by reference to FIGS. 4 and 5. The (unseeded) abrasive grain of FIGS. 4 and 5 contained about 95% by weight alumina and about 5% by weight ceria. A sol-gel process, followed by sintering, as described above, was used to prepare each sample. For the product depicted in FIG. 4, the ceria was added to the dispersion as a ceria sol. For the product of FIG. 5, the ceria was added to the dispersion as a ceria salt, i.e., ceria nitrate. Both samples were crushed to provide a powder and then immersed in a refractive index liquid which had an index of refraction of 1,760. The samples were examined under an optical microscope with cross polarizers at 400×.

The abrasive grain of both figures comprise submicron alpha alumina crystallites. A collection of these alpha alumina crystallites form a domain or cell. Within the domain, adjacent alpha alumina crystallites have low angle grain boundaries. The domains are evident in the optical photomicrograph. Between the domains is ceria. For the product of FIG. 4, the average size of the domain is between about 4 and about 6 micrometers.

For the product of FIG. 5, the average size of the domains is between about 8 and about 10 micrometers. Based on the photomicrographs, it can be theorized that processing involving addition of ceria as a ceria sol aids in reducing the domain size.

Preferred abrasive grains according to the present invention will comprise, by weight and without considering the presence of any coating, a sintered product comprising, by weight (on an elemental oxide basis): about 70 to about 99.5% alumina, about 0.5 to about 15% ceria (typically about 1 to about 15%), and up to about 15% of metal oxide selected from the group consisting of magnesium oxide, zirconia, lanthanum oxide, neodymium oxide, yttria, and combinations thereof, based on the total oxide content of the abrasive grain. Since coating is disregarded the formula is for the "core" of the sintered particles. Depending on the composition of the sintered abrasive grain, a reaction product between alumina and one or more metal oxides (and/or a reaction product between one or more metal oxides) may be present. Non-reacted alumina (i.e., alumina present as $Al_2O_3$) is present as alpha alumina.

Abrasive grains having the preferred composition stated in the previous paragraph are generally observed to have an average hardness of at least about 21 GPa (typically at least about 22 GPa) and an average toughness of at least about 4 MPa·m$^{\frac{1}{2}}$. The average hardness is measured according to American Standard Test Method (ASTM) standard E384 with a 500 gram load ("Standard Test Method for Microhardness of Materials," 1991 *Annual Books of ASTM Standards*, Sec. 3, Vol. 3.01, p 463), the test method being incorporated herein by reference. The average toughness is measured according to the microfracture indentation technique as illustrated in the article "Equilibrium Penny-Like Cracks in Indentation Fracture," by Lawn and Fuller, *J. Mat. Sci.*, Volume 10, 1974, pp. 2016-24, incorporated herein by reference.

A preferred abrasive grain containing rare earth oxide and a method of making the same is disclosed in Assignee's copending application entitled "Abrasive Grain Including Rare Earth Oxide Therein," U.S. Ser. No. 07/951,671, filed the same date as the instant application, the disclosure of which is incorporated herein by reference.

D. Abrasive Products

Abrasive grain prepared according to the present invention are useful in abrasive products. Preferably the abrasive grains will have been prepared according to the processes described herein and comprise the sintered product of a base grit material resulting from a sol-gel process wherein alpha alumina precursor is mixed with zirconia sol. Again, the abrasive grains may have been formed with, or later modified with, an impregnation process, nucleating agent processes, and/or coating process as generally indicated.

One type of abrasive product is a coated abrasive which comprises a backing (substrate) with abrasive grain, as described herein, adhered thereto by binder. The backing may be cloth, polymeric film, fiber, nonwoven web, paper, combinations thereof, or treated versions thereof. A variety of inorganic or organic binders could be utilized. The abrasive grains may be applied in one layer or a plurality of layers. Preferred methods of making coated abrasives are described in U.S. Pat. Nos. 4,734,104 (Broberg) and 4,737,163 (Larkey), the disclosures of which are incorporated herein by reference.

An example of a coated abrasive product is provided in FIG. 1 at reference numeral 1. Referring thereto, backing (substrate) 2 has abrasive layer 3 comprising abrasive grain 4 secured to a major surface of backing 2 by make coat 5 and size coat 6. In some instances, a supersize coat, not shown, may be used.

Figure 2:
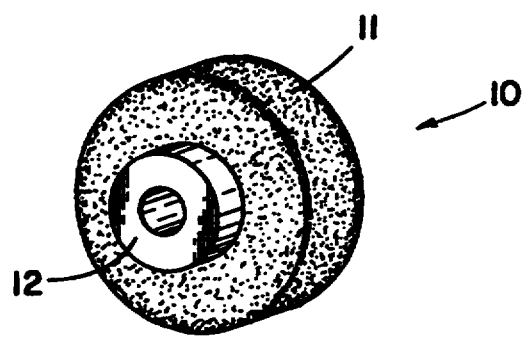
FIG. 2 is a perspective view of a bonded abrasive product incorporating abrasive grain according to the present invention therein.

Bonded abrasive products (e.g., grinding wheels and cutoff wheels) generally comprise shaped masses of abrasive grain held together by a binder. Conventional binders for grinding wheels include organic, metallic, or vitrified binder. In FIG. 2, grinding wheel 10 is depicted comprising abrasive grain 11 molded in a wheel and mounted on hub 12. For additional details in the preparation of grinding wheels see, for example, U.S. Pat. No. 4,997,461 (Markhoff-Matheny), the disclosure of which is incorporated herein by reference. Cutoff wheels can be made using conventional techniques known in the art. Binders for cutoff wheels include organic binder.

Figure 3:
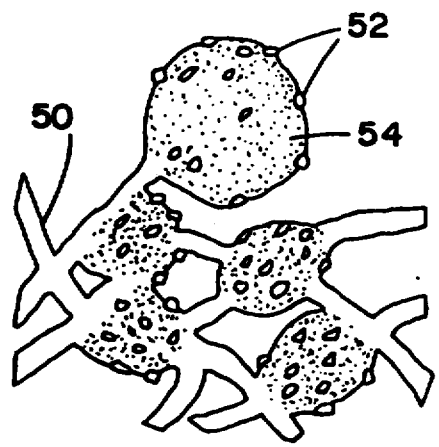
FIG. 3 is an enlarged schematic view of a nonwoven abrasive product incorporating abrasive grain according to the present invention therein.

Nonwoven abrasive products incorporating typically comprise an open porous lofty polymer filament structure having the abrasive grains of the invention distributed throughout the fiber structure and bonded therein by an organic binder. Typical fibrous filament structures usable with such constructions comprise polyamides, polyesters and polypropylenes. In FIG. 3, a schematic depiction, enlarged about 100×, of a typical nonwoven abrasive article is provided. The article comprises fibrous mat 50 as a substrate onto which abrasive grain 52 are adhered by binder 54. For additional details in the preparation of nonwoven abrasive products see, for example, U.S. Pat. No. 2,958,593 (Hoover et al.), the disclosure of which is incorporated herein by reference.

As indicated generally above, abrasive products generally comprise binder and abrasive grains or particles therein. A wide variety of binders may be utilized in abrasive products according to the present invention, including conventional ones. Useful organic binders include phenolic, urea-formaldehyde, melamine-formaldehyde, polyester resins, glue, aminoplast resins, epoxy resins, acrylate resins, urethane resins and combinations thereof. The binder may include inorganic particulates such as grinding aids or fillers. Examples of such grinding aids include cryolite, ammonium cryolite, potassium tetrafluoroborate, polyvinyl chloride, sulfur and sodium chloride. Examples of fillers include calcium carbonate, silica, and calcium metasilicate.

The abrasive products or articles may contain, as particulate material therein, 100% abrasive grains which have been prepared or improved according to the descriptions herein. In addition, or alternatively, abrasive articles may contain a blend of abrasive grains made according to the method of the present invention with conventional abrasive grains or diluent grains. Conventional abrasive grains usable in this fashion include fused aluminum oxide, silicon carbide, garnet, fused alumina, diamond, cubic boron nitride, fused alumina-zirconia, and other sol-gel abrasive grain. Diluent grains include marble, gypsum, and glass. Abrasive grains made according to the method of the present invention may be combined with abrasive agglomerates (see e.g., U.S. Pat. No. 4,799,939 (Bloecher et al.)).

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

The abrasive grains were made according to one of the two Procedures outlined below. Note that all abrasive grain formulations were based upon weight on an elemental oxide basis, and may not reflect the phases (e.g., reaction product(s)) present. After the abrasive grains were made, they were employed in a coated abrasive fibre disc which was made according to the described procedure. Next, the resulting coated abrasive discs were tested according to a Test Procedure described below.

General Procedure I for Making the Abrasive Grains

The following were charged and continuously mixed into an 18.9 liter polyethylene lined steel vessel to form a dispersion: 2515 parts of room temperature deionized water; 30 parts of 16N analytical reagent grade nitric acid; a zirconia sol; a ceria sol; and 643 parts of alpha aluminum oxide monohydrate powder sold under the trade designation Disperal®. The ceria sol was purchased from Nyacol Products Inc. of Ashland, Mass., and comprised cerium oxide, having an average particle size between about 0.01 to about 0.02 micrometer, dispersed in water with some acid (i.e., acetic or nitric acid). The ceria sol was stabilized with acetic acid and had a pH of about 3. The percent solids on the ceria sol was about 20%. The average particle size of the zirconia sol was between about 0.005 to about 0.01 micrometer. The zirconia sol was about 20% solids and was purchased from Nyacol Products Inc. of Ashland, Mass.

The resulting mixture was dispersed at high speed for 3 to 4 minutes using a Giford-Wood Homogenizer Mixer (Greeco Corp., Hudson, N.H.). The resulting sol was poured into a 46 cm by 66 cm by 5 cm polyester lined aluminum tray in which where it was dried in a forced air oven at 100° C. for about 24 hours to a friable solid. The resulting dried material was crushed using a "Bruan" type UD pulverizer having a 1.1 mm gap between the steel plates to form particles. The particles were screened between about 0.125 to about 1 mm screen size. The retained particles were fed into a kiln to form calcined particles. The calciner was a 16 cm diameter, 140 centimeter long, stainless steel tube having a 40 cm 600° C. hot zone. The tube was inclined at a 2.4 degree angle with respect to the horizontal. The tube rotated at about 6 rpm to provide a residence time within the calciner of about 5 minutes.

The impregnation solutions were prepared with deionized water. The magnesium nitrate solution was about 11% solids on an oxide basis. The yttrium nitrate solution was about 11% solids on an oxide basis. The lanthanum nitrate solution was about 28% solids, and the cerium nitrate solution was about 39% solids. For every impregnation step, there was approximately twice as much by volume of the calcined particles to the impregnation solution by volume. The impregnation solution and the calcined particles were thoroughly mixed together to cause the solution to be impregnated into the calcined particles by capillary action. The resulting impregnated particles were dried in a forced air oven at 100° C. for about 10 hours. The dried particles were then fed into a rotary calciner as described above.

Next, the calcined, impregnated particles were fed into a 1400° C. kiln. The kiln was a 8.9 cm diameter, 1.3 meter long silicon carbide tube inclined at 4.4 degrees with respect to the horizontal, and had a 76 cm hot zone. The kiln rotated at 6 rpm to provide a residence time in the kiln of about 5 minutes. The product exited the kiln into room temperature air where it was collected in a metal container and allowed to cool to room temperature.

General Procedure II for Making the Abrasive Grains

The General Procedure II for Making the Abrasive Grains was the same as General Procedure I except for the following changes. The zirconia sol and the ceria sol were not present in the original dispersion. Additionally, zirconyl acetate (21% solids) and cerium nitrate (39% solids) were present in the impregnation solution.

General Procedure for Making the Coated Abrasive Disc

The abrasive grains were utilized in coated abrasive products which were tested for grinding performance. The coated abrasive products were made according to conventional coated abrasive making procedures. A grade 50 abrasive grain was prepared by taking 50% by weight from abrasive grains that passed through a mesh U.S. standard screen, but remained on a 45 mesh U.S. standard screen. The remaining 50% were abrasive grains that passed through a 40 mesh U.S. standard screen, but were retained on a 50 mesh U.S. standard screen. Likewise a grade 36 abrasive grain was prepared by taking 50% by weight from abrasive grains that passed through a 25 mesh U.S. standard screen, but remained on a 30 mesh U.S. standard screen. The remaining 50% were abrasive grains that passed through a 30 mesh U.S. standard screen, but were retained on a 35 mesh U.S. standard screen. The abrasive grains were bonded to vulcanized fibre backings using conventional calcium carbonate filled phenolic make resin and conventional calcium carbonate filled phenolic size resins. The make resin was pre-cured by heating to about 88° C. at a rate of about 1.1° C./minute, and then holding at about 88° C. for about 2 hours. The size resin was cured by heating to about 65° C. at a rate of about 1.1° C./minute, and then holding at about 65° C. for about 30 minutes, followed by a heating to about 99° C. at a rate of about 0.6° C./minute, and then holding at about 99° C. for about 12 hours. The abrasive grains were electrostatically coated.

Test Procedure I

The coated abrasive disc was mounted on a beveled aluminum back-up pad and used to grind the face of a 1.25 cm by 18 cm 1018 mild steel workpiece. The disc was driven at 5,500 rpm while the portion of the disc overlaying the beveled edge of the back-up pad contacted the workpiece at about a 6 kg load. Each disc was used to grind a separate workpiece for a one minute interval for a total time of 15 minutes. The initial cut was the amount of metal removed in the first minute of grinding. Likewise the final cut was the amount of metal removed in the last minute of grinding and the total cut was the summation of the amount removed throughout the test. In most of the examples, the performance of the abrasive grain was stated as percent of Comparative (i.e., the total amount of metal removed for the Comparative example was equated to 100% and the abrasive grain of the examples was measured relative to the 100%). There were approximately four discs per example tested. The error associated with the test was about ±5%.

Test Procedure II

The Test Procedure II was essentially the same as Test Procedure I, except that the test endpoint was 20 minutes.

EXAMPLE 1

Hardness and Density of an Abrasive Grain Made with Ceria Sol vs a Grain Made with Ceria Salt The Vickers hardness at a 500 gram load and density were measured for an abrasive grain made using a ceria sol (Example 1; FIG. 4) and an abrasive grain made using a ceria salt (Comparative Example A; FIG. 5). Both abrasive grains contained by weight 95% alumina and 5% ceria (see Table 1, below). Both were made according to General Procedure I, except no zirconia sol was used, and there were no impregnation steps. The procedures used for measurement were as referenced above in the text.

Specifically, for both the microhardness and the toughness measurements, abrasive grains were mounted in a conventional molding compound (commercially available under the trade designation "EPOMET" from Buehler, Ltd. of Evanston, Ill.) in 2.5 cm (1 inch) diameter stainless steel mold rams. The grains and the molding compound were then pressed at 27.6 MPa (4000 psi) and simultaneously heated to about 150° C. in a conventional mounting press (commercially available under the trade designation "BUEHLER PNEUMET I MOUNTING PRESS" from Buehler, Ltd.). The molding compound was then cured by holding it at about 150° C. for about 5 minutes. The cured molding compound was then cooled to room temperature.

The mounted abrasive grains were then polished using a polishing unit (commercially available under the trade designation "DIALOG" from Buehler, Ltd.) having a microprocessor control that dispenses abrasive slurries to the polishing area (commercially available under the trade designation "METLAP I" from Buehler, Ltd.). The polishing was done in the following successive stages:

Stage 1

Polishing surface: alumina platen, 20.3 cm diameter (commercially available under the trade designation "METLAP 10" from Buehler, Ltd. )
Abrasive Type & Size: 30 micrometer diamond slurry (commercially available under the trade designation "METADI DIAMOND SLURRY" from Buehler, Ltd.)
Polishing Time: 3 minutes, or until the surface is flat
Force: 22.2N/sample (5 pounds/sample)
Speed setting: 240 rpm
Dispensing sequence: 1 second spray on; 10 spray off
Relative rotation: clockwise

Stage 2

Polishing surface: polishing cloth (commercially available under the trade designation "TEXMET POLISHING CLOTH" from Buehler, Ltd.) clamped on a 20.3 diameter aluminum platen (commercially available under the trade designation "METLAP" from Buehler, Ltd.).
Abrasive Type & Size: 6 micrometer diamond slurry (commercially available under the trade designation "METADI DIAMOND SLURRY" from Buehler, Ltd.)
Polishing Time: 10 minutes
Force: 22.2N/sample (5 pounds/sample)
Speed setting: 120 rpm
Dispensing sequence: 1 second spray on; 10 spray off
Relative rotation: counterclockwise

Stage 3

Polishing surface: polishing cloth ("TEXMET POLISHING CLOTH") clamped on a 20.3 diameter aluminum platen ("METLAP")
Abrasive Type & Size: 1 micrometer diamond slurry (commercially available under the trade designation "METADI DIAMOND SLURRY" from Buehler, Ltd.)
Polishing Time: 30 minutes
Force: 22.2N/sample (5 pounds/sample)
Speed setting: 120 rpm
Dispensing sequence: 1 second spray on; 10 seconds spray off
Relative rotation: clockwise The Vickers microhardness of the abrasive grains were measured using a conventional microhardness tester with a diamond indenter (commercially available under the trade designation "MINILOAD 2 MICROHARDNESS TESTER" from Leitz of Germany). The indenter (a highly polished pointed square pyramidal diamond with a face angle of 136 degrees) was brought into contact gradually and smoothly with the sample to be measured. The predetermined load was 500 grams. The average of 20 measurements for each example are provide in Table 1, below.

If toughness measurement were made, the same instrument as described above for the Vickers microhardness measurement would be used, wherein a predetermined load is applied to the sample to be tested causing cracks to generate at the apex of the diamond shape impression of the indenter. The toughness would be determined using the following equation:

$$\text{Toughness, } K_1 = \frac{F_N}{((\text{pi})c)^{3/2} (\tan \beta)},$$

wherein c is the crack radius, $F_N$ is the indenter load, and $\beta$ is the semi-apical angle of the indenter (68 degrees for a Vickers diamond). The average of 20 measurements for each example would provide the average toughness. The densities of the abrasive grains, as measured with a Micromeritics AccuPyc (Norcross, Ga.) 1330 pycnometer, are provided in Table 1, below.

TABLE 1

| Example | Hardness, GPa | Density, g/cc |
| --- | --- | --- |
| 1 | 16.29 ± 0.6 | 3.74 |
| Comparative A | 14.84 ± 3.3 | 3.62 |

There is a significant difference in hardness and density between the grain made with the sol and the grain made with salt, even with the experimental error taken into account. Thus, it can be concluded that processes involving addition of ceria as a sol rather than as a salt lead to harder grains.

COMPARATIVE EXAMPLE B

The abrasive grains of Comparative B were made according to the teachings of U.S. Pat. 4,881,951. The grains were made according to the impregnation method and had a composition by weight on an elemental basis of 96.4% alumina, 1.2% lanthanum oxide, 1.2% neodymium oxide, and 1.2% magnesium oxide.

EXAMPLES 2 THROUGH 5

The abrasive grains from this set of examples compared various levels of ceria in the abrasive grains. The abrasive grains were screened to a grade 50. The test results can be found in Table 2, below. For Examples 2 through 5, the abrasive grains were made according to General Procedure I (ceria sol addition). The amount of zirconia sol was 63.8 parts by weight. The impregnation solution contained lanthanum nitrate, magnesium nitrate, and neodymium nitrate. The amounts of these materials were selected such that the sintered abrasive grain contained 1.2% $Nd_2O_3$, 1.2% $La_2O_3$, and 1.2% MgO. The following amounts of ceria were used in each example: Example 2 was 31.9 parts, Example 3 was 63.8 parts, Example 4 was 127.5 parts and Example 5 was 191.3 parts.

TABLE 2

| | Test Procedure I | | |
|---|---|---|---|
| Example | Initial cut, grams | Final cut, grams | Total cut, % of Comparative B |
| Comparative B | 71.3 | 33.9 | 100 |
| 2 | 84.8 | 42.1 | 122 |
| 3 | 81.7 | 55.3 | 130 |
| 4 | 75.3 | 50.0 | 121 |
| 5 | 73.9 | 55.1 | 116 |

EXAMPLES 6 THROUGH 9

The abrasive grains from this set of examples compared various levels of ceria and magnesia in the abrasive grains. The abrasive grains were screened to a grade 50. The test results can be found in Table 4, below. For Examples 6 through 9, the abrasive grains were made according to General Procedure I (ceria sol addition). The amount of zirconia sol was 63.8 parts by weight. The impregnation solution contained yttrium nitrate, lanthanum nitrate, magnesium nitrate, and neodymium nitrate. The amounts of these materials and the amount of the ceria sol were selected to give each of the sintered abrasive grains a composition (elemental basis) according to that listed in Table 3, below.

TABLE 3

| | Composition of the Abrasive Grains | | | | | | |
|---|---|---|---|---|---|---|---|
| Ex | % $Al_2O_3$ | % $La_2O_3$ | % $Y_2O_3$ | % MgO | % $ZrO_2$ | % $CeO_2$ | % $Nd_2O_3$ |
| 6 | 93.25 | 1.2 | 0.6 | 0.75 | 2 | 1 | 1.2 |
| 7 | 92.25 | 1.2 | 0.6 | 0.75 | 2 | 2 | 1.2 |
| 8 | 90.8 | 1.2 | 0.6 | 1.2 | 2 | 3 | 1.2 |
| 9 | 89.8 | 1.2 | 0.6 | 1.2 | 2 | 4 | 1.2 |

TABLE 4

| | Test Procedure II | | |
|---|---|---|---|
| Example | Initial cut, grams | Final cut, grams | Total cut, % of Comparative B |
| Comparative B | 64.2 | 35.4 | 100 |
| 6 | 69.6 | 70.0 | 126 |
| 7 | 68.0 | 51.4 | 115 |
| 8 | 71.4 | 63.5 | 129 |
| 9 | 67.1 | 65.3 | 129 |

EXAMPLES 10 THROUGH 17

The abrasive grains from this set of examples concerned comparison of various levels of ceria and other metal oxide modifiers in the abrasive grains. The abrasive grains were screened to a grade 50. The test results can be found in Table 6, below. For Examples 10 through 17, the abrasive grains were made according to General Procedure I (ceria sol addition). The amount of zirconia sol was 63.8 parts by weight. The impregnation solution contained yttrium nitrate, lanthanum nitrate, magnesium nitrate, and neodymium nitrate. The amounts of these materials and the amount of the ceria sol were selected to give the sintered abrasive grain compositions (elemental basis) according to Table 5, below.

COMPARATIVE EXAMPLES C THROUGH J

The abrasive grains from this set of examples had the cerium and zirconium added as salts rather than as sols. The abrasive grains were screened to a grade 36. The test results can be found in Table 7, below. For Comparative Examples C through J, the abrasive grains were made according to General Procedure II. The impregnation solution contained yttrium nitrate, zirconyl acetate, cerium nitrate, lanthanum nitrate, magnesium nitrate, and neodymium nitrate. The amounts of these materials were selected to give the sintered abrasive grain compositions (elemental basis) according to Table 5, below.

TABLE 5

| | Composition of the Abrasive Grains | | | | | | |
|---|---|---|---|---|---|---|---|
| Ex* | % $Al_2O_3$ | % $La_2O_3$ | % $Y_2O_3$ | % MgO | % $ZrO_2$ | % $CeO_2$ | % $Nd_2O_3$ |
| 10&C | 94 | 0 | 1.5 | 1.5 | 2 | 1 | 0 |
| 11&D | 92.8 | 1.2 | 0.6 | 1.2 | 2 | 1 | 1.2 |
| 12&E | 93 | 0 | 1.5 | 1.5 | 2 | 2 | 0 |
| 13&F | 91.8 | 1.2 | 0.6 | 1.2 | 2 | 2 | 1.2 |
| 14&G | 92 | 0 | 1.5 | 1.5 | 2 | 3 | 0 |
| 15&H | 90.8 | 1.2 | 0.6 | 1.2 | 2 | 3 | 1.2 |
| 16&I | 91 | 0 | 1.5 | 1.5 | 2 | 4 | 0 |
| 17&J | 89.8 | 1.2 | 0.6 | 1.2 | 2 | 4 | 1.2 |

*The Table concerns pairs of Examples and Comparatives. For example, Example 10 and Comparative C had the same composition (elemental basis). However, Example 10 concerned ceria sol addition, Comparative C concerned ceria salt introduction.

TABLE 6

| | Test Procedure I | |
|---|---|---|
| Example | Initial cut, grams | Total cut % of Comparative B |
| 10 | 76.2 | 110 |
| 11 | 80.2 | 115 |
| 12 | 72.8 | 97 |
| 13 | 78.3 | 123 |
| 14 | 85.3 | 113 |
| 15 | 81.1 | 122 |
| 16 | 78.7 | 119 |
| 17 | 77.7 | 119 |
| Comparative B | 71.1 | 100 |
| Comparative C | 76.5 | 85 |
| Comparative D | 83.4 | 102 |
| Comparative E | 71.8 | 84 |
| Comparative F | 87 | 100 |
| comparative G | 73 | 85 |
| Comparative H | 81.2 | 95 |
| Comparative I | 80.9 | 88 |
| Comparative J | 76.7 | 97 |

EXAMPLES 18 THROUGH 21 AND COMPARATIVE EXAMPLE B

The abrasive grains from this set of examples allow comparison of various levels of ceria in the abrasive grains. The abrasive grains were screened to a grade 50.

The test results can be found in Table 8, below. For Examples 18 through 21, the abrasive grains were made according to General Procedure I (ceria sol addition). The amount of zirconia sol was 67.8 parts by weight. The impregnation solution contained lanthanum nitrate, magnesium nitrate, yttrium nitrate, and neodymium nitrate. The sintered abrasive grains formulations are listed in Table 7, below. The amount of ceria sol present in the dispersion for each example was the following: Example 18 was 31.9 parts, Example 19 was 63.8 parts, Example 20 was 127.5 parts and Example 21 was 191.3 parts by weight.

TABLE 7

| | Abrasive Grain Formulations | | | | | | |
|---|---|---|---|---|---|---|---|
| Ex | % $Al_2O_3$ | % $ZrO_2$ | % $La_2O_3$ | % $Nd_2O_3$ | % $Y_2O_3$ | % $CeO_2$ | % MgO |
| 18 | 92.2 | 2 | 1.2 | 1.2 | 1.2 | 1 | 1.2 |
| 19 | 91.2 | 2 | 1.2 | 1.2 | 1.2 | 2 | 1.2 |
| 20 | 90.2 | 2 | 1.2 | 1.2 | 1.2 | 3 | 1.2 |
| 21 | 89.2 | 2 | 1.2 | 1.2 | 1.2 | 4 | 1.2 |

TABLE 8

| | Test Procedure I | | |
|---|---|---|---|
| Example | Initial cut, grams | Final cut, grams | Total cut, % of Comparative B |
| Comparative B | 71 | 38 | 100 |
| 18 | 76 | 57 | 110 |
| 19 | 73 | 38 | 97 |
| 20 | 85 | 46 | 113 |
| 21 | 79 | 53 | 119 |

EXAMPLES 22 THROUGH 25 AND COMPARATIVE EXAMPLE B

The abrasive grains for Examples 22 through 25 were made in the same manner as Examples 18 through 21, respectively, except that the amount of yttria in the sintered abrasive grain was reduced to about 0 6%. Likewise, the amount of alumina in the abrasive grains of Examples 22 through 25 was increased by about 0.6% in comparison to the abrasive grains of Examples 18 through 21. The test results can be found in Table 9, below.

TABLE 9

| | Test Procedure I | | |
|---|---|---|---|
| Example | Initial cut, grams | Final cut, grams | Total cut, % of Comparative B |
| Comparative B | 71 | 38 | 100 |
| 22 | 80 | 61 | 125 |
| 23 | 78 | 64 | 123 |
| 24 | 81 | 56 | 122 |
| 25 | 78 | 58 | 119 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of preparing abrasive grain, said method comprising the steps of:
   (a) preparing a dispersion comprising alumina hydrate and a sufficient amount of a sol of ceria particles to provide after steps (b) and (c) abrasive grain having greater than 0.5% by weight ceria present as one of ceria, at least one ceria reaction product, or a combination thereof, based on the total weight of said abrasive grain, wherein at least about 97% by weight of said ceria particles are less than about 0.5 micrometer in size;
   (b) forming alumina base grits from said dispersion; and
   (c) sintering said alumina base grits to provide abrasive grain comprising greater than 0.5% by weight ceria present as one of ceria, at least one ceria reaction product, or a combination thereof, based on the total weight of said abrasive grain.

2. A method according to claim 1 wherein said dispersion comprises a sufficient amount of a sol of ceria particles to provide after steps (b) and (c) abrasive grain having at least about 1% by weight ceria present as one of ceria, at least one ceria reaction product, or a combination thereof.

3. A method according to claim 2 wherein said dispersion is aqueous, and wherein said alumina base grits of step (b) are calcined before said sintering of step (c).

4. A method according to claim 1 wherein said dispersion is aqueous and contains sufficient ceria therein such that said abrasive grain comprises between greater than 0.5 and about 15% by weight ceria present as one of ceria, at least one ceria reaction product, or a combination thereof, and said method further comprises the step of calcining said alumina base grits of step (b) before said sintering of step (c).

5. A method according to claim 3 wherein said ceria sol of step (a) comprises less than about 50% by weight colloidal ceria particles of less than about 0.1 micrometer in size.

6. A method according to claim 3 wherein said dispersion further comprises zirconia sol.

7. A method according to claim 3 wherein said aqueous dispersion further comprises a nucleating material.

8. A method according to claim 3 including providing said sintered abrasive grain with a coating comprising zirconia, alumina, silica, or a combination thereof.

9. A method according to claim 3, wherein said calcined alumina base grits are porous, said method further comprising the steps of:
   (i) impregnating said porous alumina base grit material with an impregnating solution of precursor of an oxide selected from the group consisting of: lanthanum, neodymium, yttrium, magnesium, zirconium, and mixtures thereof; and
   (ii) calcining the impregnated grit prior to said sintering step.

10. A method according to claim 9, wherein said alumina hydrate is present in said dispersion in an amount sufficient to provide said abrasive grain with about 70 to less than 99.5% by weight alumina; and said sol of ceria particles is present in said dispersion in an amount sufficient to provide said abrasive grain with greater than 0.5 to about 15% by weight ceria; and a sufficient amount of said oxide precursor being impregnated into said alumina base grit to provide up to about 15% by weight of metal oxide selected from the group consisting of magnesium oxide, zirconia, lanthanum oxide, neodymium oxide, yttria, and combinations thereof, based on the total weight of said abrasive grain.

11. A method of preparing abrasive grain, said method comprising the steps of:
   (a) preparing a dispersion comprising alumina hydrate and an effective amount of a sol of ceria particles, wherein at least about 97% by weight of said ceria particles are less than about 0.5 micrometer in size, said dispersion being essentially free of cerium salt;

(b) forming alumina base grits from said dispersion; and (c) sintering said alumina base grits to provide abrasive grain.

12. A method according to claim 11 wherein said dispersion is aqueous, and wherein said alumina base grits of step (b) are calcined before said sintering of step (c).

13. A method according to claim 12 wherein said dispersion contains sufficient ceria therein such that said abrasive grain comprises between about 0.1 and about 15% by weight ceria.

14. A method according to claim 12 wherein said ceria sol of step (a) comprises less than about 50% by weight colloidal ceria particles of less than about 0.1 micrometer in size.

15. A method according to claim 12 wherein said dispersion further comprises zirconia sol.

16. A method according to claim 12 wherein said aqueous dispersion further comprises a nucleating material.

17. A method according to claim 12 wherein said aqueous dispersion further comprises a precursor of an oxide selected from the group consisting of: lanthanum, neodymium, yttrium, magnesium, zirconium, and mixtures thereof.

18. A method according to claim 12 including a step of impregnating said calcined alumina base grits with a precursor of an oxide selected from the group consisting of: lanthanum, neodymium, yttrium, magnesium, zirconium, and mixtures thereof prior to said step of sintering.

19. A method according to claim 12 including providing said sintered abrasive grain with a coating comprising zirconia, alumina, silica, or a combination thereof.

20. A method according to claim 12, wherein said calcined alumina base grits are porous, said method further comprising the steps of:

(i) impregnating said porous alumina base grit material with an impregnating solution of oxide precursor selected from the group consisting of precursor to oxides of: lanthanum, neodymium, yttrium, magnesium, zirconium, and mixtures thereof; and (ii) calcining the impregnated grit prior to said sintering step.

21. A method according to claim 20 wherein said alumina hydrate is present in said dispersion in an amount sufficient to provide said abrasive grain with about 70 to about 99.9% by weight alumina; said sol of ceria particles is present in said dispersion in an amount sufficient to provide said abrasive grain with about 0.1 to about 15% by weight ceria; and a sufficient amount of said oxide precursor is impregnated into said alumina base grit to provide up to about 15% by weight of metal oxide selected from the group consisting of magnesium oxide, zirconia, lanthanum oxide, neodymium oxide, yttria, and combinations thereof, based on the total weight of said abrasive grain.

* * * * *

UNITED STATES PATENT AND TRADEMARK OFFICE
CERTIFICATE OF CORRECTION

PATENT NO.: 5,429,647
DATED: July 4, 1995
INVENTOR(S): Larmie

It is certified that error appears in the above-identified patent and that said Letters Patent is hereby corrected as shown below:

Col. 8, line 59, "1,760" should be --1.760--.

Col. 17, line 38, "0 6%" should be --0.6%--.

Signed and Sealed this

Twenty-fifth Day of June, 1996

Attest:

Attesting Officer

BRUCE LEHMAN

Commissioner of Patents and Trademarks